June 14, 1932. G. W. KUHLMAN 1,862,574
TRUCK TRAILER HOIST AND SUPPORT
Filed Jan. 7, 1929 2 Sheets-Sheet 1

INVENTOR.
George W. Kuhlman,
BY
Morsell, Keeney & Morsell
ATTORNEYS

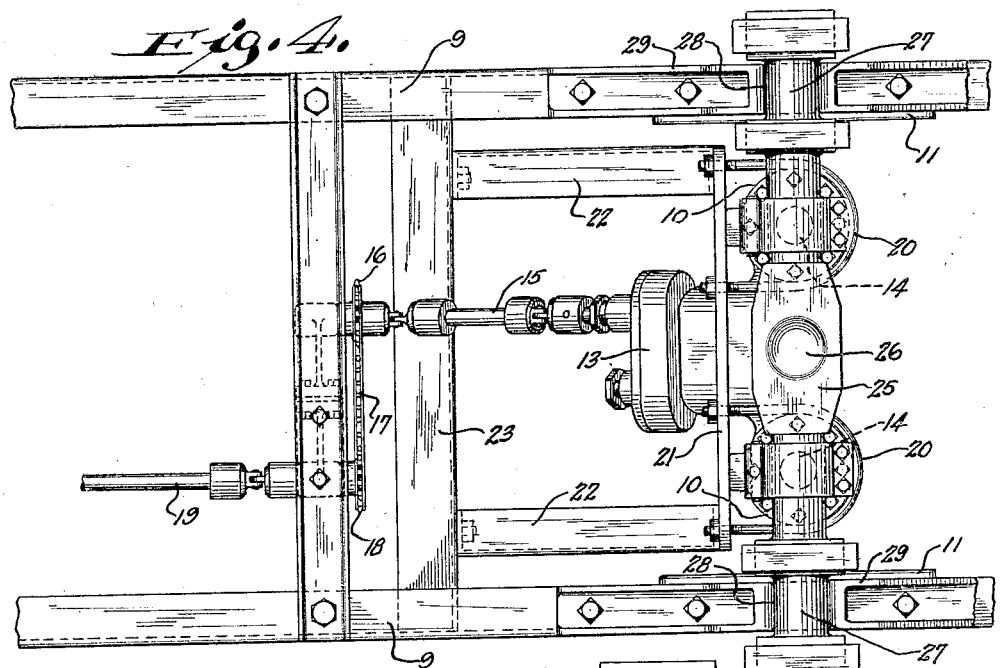
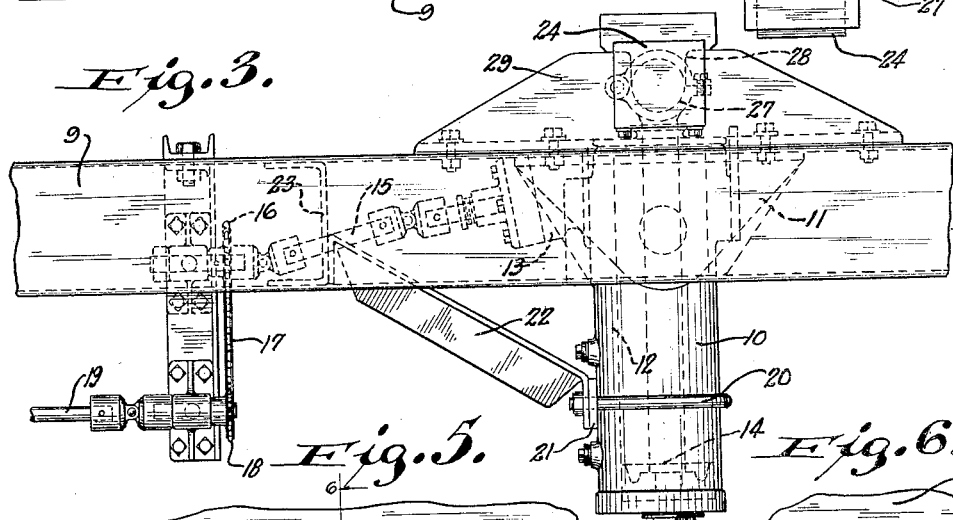
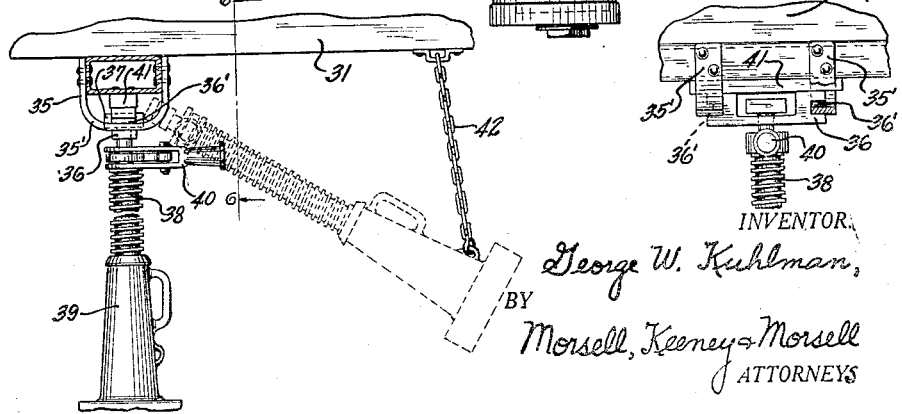

Patented June 14, 1932

1,862,574

UNITED STATES PATENT OFFICE

GEORGE W. KUHLMAN, OF LONG ISLAND CITY, NEW YORK, ASSIGNOR TO THE HEIL CO., OF MILWAUKEE, WISCONSIN, A CORPORATION OF WISCONSIN

TRUCK TRAILER HOIST AND SUPPORT

Application filed January 7, 1929. Serial No. 330,799.

This invention relates to improvements in truck trailer hoists and supports.

The use and structure of large trailers for trucks has presented a difficult problem. If a four wheeled trailer is used and the front axle is pivotal, to allow the trailer to turn easily, its control is difficult. If a four wheeled trailer is used in which the front axle is rigid, the trailer will not turn readily. Hence, it has been found that the use of a trailer having only two rear supporting wheels is more practical and the king bolt of the trailer is pivotally engaged with a rear portion of the truck. However, with this arrangement the engagement and disengagement of the trailer king bolt with the truck has been hard to manage and when the trailer is detached from the truck, supporting means for the front end portion of the trailer must be quickly supplied.

It is, therefore, the primary object of the present invention to provide a two-wheeled truck trailer equipped with attached supporting means for the front portion of the trailer which may be easily and quickly moved to and from supporting or effective positions.

An allied object of the invention is to provide in a combined truck and two-wheeled trailer hoist means for raising the front end portion of the trailer to permit the detachment of the trailer king bolt from the truck.

A further object of the invention is to provide in a combined truck and trailer, wherein the trailer is pivotally connected to the truck by a king bolt, brackets on the rear end portion of the truck rigidly engaging a member interposed between the truck and trailer and relieving the king bolt from pulling strain.

A further object of the invention is to provide in a connected truck and trailer, hoisting and supporting means for the trailer which are very simple in construction and operation, are strong and durable, and are well adapted for the purposes described.

With the above and other objects in view the invention consists of the improved truck trailer hoist and support, and its parts and combinations as set forth in the claims, and all equivalents thereof.

In the accompanying drawings in which the same reference characters indicate the same parts in all of the views:

Fig. 1 is a side view of a truck and two-wheeled trailer connected thereto and showing the trailer support;

Fig. 2 is an enlarged, fragmentary, detail view showing in perspective the rear end portion of a truck and the attached front end portion of a trailer, the view also showing the trailer hoist and support;

Fig. 3 is a side view of the rear end portion of the frame or chassis of the truck showing the trailer hoist mechanism;

Fig. 4 is a plan view thereof;

Fig. 5 is an enlarged fragmentary detail view showing the under-portion of the trailer, a supporting member and the manner in which it is attached; and Fig. 6 is a sectional view taken on line 6—6 of Fig. 5.

Referring now more particularly to the drawings, it will appear that the numeral 8 indicates a truck having side frame or chassis members 9. Mounted between said chassis members, near the rear end portions thereof, is a hydraulic hoist which includes a pair of spaced cylinders 10 carried by brackets 11 connected to the members 9. Each cylinder contains a side oil duct 12, said ducts being in communication with a gear pump 13 which forces oil under pressure into said ducts and below a piston 14 in each cylinder to raise said pistons. The pistons are adapted to extend through the upper end portions of said cylinders. Said cylinders have controlled ports to allow the flow of oil back to the pump. The pump is operated by shafts 15 connected to a gear 16 and said gear is driven by a chain 17 from another gear 18 which is connected through a shaft 19 with the truck transmission. It is further to be observed that the lower portion of each cylinder is encircled by a U-bolt 20, and the arms of said U-bolts are connected by a transverse bar 21. A brace member 22 is connected to each U-bolt and to the end portions of said bar, and said brace members extend rearwardly upwardly and are secured to a transverse frame member 23.

The upper end portions of the pistons 14 have mounted thereon so as to move vertically therewith a transverse bar 24 formed with a central block portion 25 having a king bolt socket 26. Also, said bar has outer rounded hub portions 27 to lodge within, when the pistons and bar are in lowered position, recesses 28 formed in opposed bracket portions 29 which project upwardly from the rear end portions of the side frame members 9. There is also connected between an intermediate portion of the bar 24 and the truck frame, a coiled spring 30 for the purpose hereinafter to be explained.

A trailer, indicated generally by the numeral 31, is adapted for connection with the rear end portion of the truck. The particular type of trailer shown is comparatively large and heavy and is provided with but a single pair of rearwardly disposed supporting wheels 32 mounted on an axle 33. Depending from a front under portion of the trailer, intermediate its sides, is a king bolt 34 adapted to be pivotally received by the king bolt socket 26 is the transverse bar 24, by which means the trailer is connected to the truck.

The under-surface of the trailer, comparatively close to the front end thereof, is provided with a pair of spaced depending brackets 35. Each bracket comprises a pair of spaced U-shaped members 35' on which a block 36, formed with recessed end portions 36'. is slidably mounted.

The head portion 37 of a jack screw 38 is vertically movably extended through said block 36 and the jack screw is turned inwardly and outwardly with respect to a jack base 39 by means of an operating handle 40 having a ratchet engagement with the jack screw. In raised or extended positions of the jack screw the head portion 37 thereof will engage a block 41 carried by the bracket 35. During normal use of the trailer, when it is attached to the truck, the jack members or supports are held suspended below the trailer and above the ground by disengageable chains 42.

In Figs. 1 and 2 the trailer is shown as being engaged with the truck. If it is desired to disconnect the trailer from the truck, this is easily and quickly accomplished. First the hoist mechanism at the rear of the truck body is set into operation and through the upward movement of the pistons 14 the front end portion of the trailer is raised with respect to the truck body. After the trailer has been suitably elevated, the jack or supporting members 39 may be released from their suspended positions and adjusted so as to be interposed vertically between the ground and the under-portion of the front end of the trailer and to support said front end portion in elevated position. Then, the hoist mechanism may be lowered, the spring 30 aiding this movement, and because of the lowering movement the king bolt 34 is removed from its socket 26 whereby an entire disconnection between the trailer and truck is effected. The truck may then be run forwardly away from its trailer and the trailer is left where desired effectively supported. The attachment of the trailer to the truck is the reverse of the procedure described.

From the foregoing description it will be seen that the improved truck trailer hoist and support is simple and novel, and is well adapted for the purposes described.

What is claimed as the invention is:

1. A truck trailer connection, comprising a truck having a hoisting mechanism and a bar carried thereby and movable therewith, said bar being formed with a central socket, a pair of recessed brackets rigidly mounted on the opposite sides of the rear portion of the truck, a two-wheeled trailer having its front end engaged and supported by said bar, and a king bolt carried by the front end portion of said trailer and engageable with said socket when alined therewith, said bar having intermediate portions engageable with said brackets when the bar and hoisting mechanism are in lowered position and the trailer king bolt is engaged in said socket.

2. A truck trailer connection comprising, a power operated vehicle having a hydraulic hoist mechanism mounted on its rear end portion, a pair of opposed recessed bracket members rigidly mounted on the rear end portion of said vehicle, a socket bar extending transversely of the vehicle and carried by said hoist mechanism and movable therewith, a coiled spring extended between the socket bar and a portion of the vehicle and connected at its end portions with both of the latter, the end portions of said socket bar being adapted to lodge within the recesses of said brackets when the hoist mechanism and socket bar are in lowered position, a two-wheeled trailer, and a king bolt depending from the front end portion thereof, said socket bar being adapted to support the front end portion of the trailer and the king bolt and socket being relatively engageable and disengageable when the hoist mechanism is operated.

3. A truck trailer connection comprising, a power operated vehicle having a hydraulic hoist mechanism mounted on its rear end portion, a pair of opposed recessed bracket members rigidly mounted on the rear end portion of said vehicle, a socket bar extending transversely of the vehicle and carried by said hoist mechanism and movable therewith, the end portions of said socket bar being adapted to lodge within the recesses of said brackets when the hoist mechanism and socket bar are in lowered position, a two-wheeled trailer, and a king bolt depending from the front end portion thereof, said socket bar being adapted to support the front end portion of the trailer and the king bolt and socket being relatively engageable and disengageable when the hoist mechanism is operated.

4. A truck trailer connection comprising, a vehicle having hoisting mechanism mounted thereon, a recessed bracket mounted on said vehicle on each side of said mechanism, a trailer having a king bolt, and a centrally socketed bar interposed between said trailer and said hoisting mechanism and brackets, said bar being adapted to coact with the recesses of said brackets when said bar is lowered by said mechanism and also being formed to coact with the adjacent portion of said trailer and with said king bolt, and said bar and recesses being relatively disengageable when said hoisting mechanism is operated.

5. A truck trailer connection comprising, a vehicle having laterally adjacent hoist cylinders rigidly attached thereto, pistons movable within said cylinders independently of each other, a trailer having a portion extending over said cylinders, and a supporting bar for said trailer interposed between said trailer and said pistons and extending transversely of said vehicle, said bar being pivotally connected to said trailer and being adapted to tilt relative to said pistons when the latter are displaced differentially within said cylinders.

6. A truck trailer connection comprising, a vehicle having laterally adjacent hoist cylinders rigidly attached thereto, pistons movable upwardly within said cylinders independently of each other, a recessed bracket mounted on said vehicle adjacent to each of said cylinders, a trailer having a portion extending over said cylinders and brackets, and a supporting bar for said trailer interposed between said trailer and said pistons and extending transversely of said vehicle and over said recesses, said bar being pivotally connected to said trailer and engageable with said bracket recesses, and said bar being adapted to tilt relative to said pistons when the latter are differentially elevated within said cylinders.

7. A truck trailer connection comprising, a truck having thereon laterally spaced differentially movable hydraulic hoist members, a trailer having a portion extending over said hoist members, and a trailer supporting element interposed between said trailer portion and said hoist members and extending transversely of said truck, said element being pivotally connected to said trailer and being adapted to tilt relative to said hoist members when the latter are displaced differentially relative to said truck.

In testimony whereof I affix my signature.

GEORGE W. KUHLMAN.